(12) United States Patent
Kissel, Jr.

(10) Patent No.: US 9,096,236 B2
(45) Date of Patent: Aug. 4, 2015

(54) TRANSITIONAL MODE HIGH SPEED RAIL SYSTEMS

(75) Inventor: Waldemar F. Kissel, Jr., Gainesville, FL (US)

(73) Assignee: WFK & Associates, LLC, Gainesville, FL (US)

( * ) Notice: Subject to any disclaimer, the term of this patent is extended or adjusted under 35 U.S.C. 154(b) by 0 days.

(21) Appl. No.: 13/589,776

(22) Filed: Aug. 20, 2012

(65) Prior Publication Data
US 2013/0055921 A1 Mar. 7, 2013

Related U.S. Application Data

(60) Provisional application No. 61/524,822, filed on Aug. 18, 2011.

(51) Int. Cl.
*B61C 13/04* (2006.01)
*B61B 3/02* (2006.01)

(52) U.S. Cl.
CPC . *B61C 13/04* (2013.01); *B61B 3/02* (2013.01); *Y02T 30/10* (2013.01); *Y02T 30/30* (2013.01)

(58) Field of Classification Search
CPC ......... B61C 13/04; B60L 11/00; B60L 13/06; B60L 5/38; B61B 3/02; B61B 13/00; B61B 13/04; B61B 15/00; B61B 1/00
USPC ............... 104/118–124; 105/215.1, 215.2
See application file for complete search history.

(56) References Cited

U.S. PATENT DOCUMENTS

| | | | |
|---|---|---|---|
| 1,853,572 A | 4/1932 | Nugent | |
| 2,042,265 A | 5/1936 | Main | |
| 2,043,703 A | 6/1936 | Main | |
| 2,135,307 A | 11/1938 | Keator | |
| 2,150,348 A | 3/1939 | Strauss | |
| 2,161,106 A | 6/1939 | Strauss et al. | |
| 2,193,046 A | 3/1940 | Strauss et al. | |
| 2,541,514 A | 2/1951 | Herold | |
| 3,225,704 A | 12/1965 | Gilvar et al. | |
| 3,254,608 A * | 6/1966 | Alden | 104/295 |
| 3,338,184 A | 8/1967 | Fisher | |
| 4,313,383 A * | 2/1982 | Parazader | 104/124 |
| 4,489,659 A | 12/1984 | Kamohara et al. | |
| 5,813,349 A * | 9/1998 | Jensen | 104/28 |
| 6,012,396 A * | 1/2000 | Schulz | 105/72.2 |
| 6,324,994 B1 * | 12/2001 | Glenn | 105/72.2 |
| 6,450,103 B2 * | 9/2002 | Svensson | 104/120 |
| 6,564,516 B1 * | 5/2003 | Svensson | 52/174 |
| 6,622,637 B2 * | 9/2003 | Cummins | 105/199.2 |
| 6,923,124 B2 * | 8/2005 | Roane | 104/124 |

(Continued)

*Primary Examiner* — Jason C Smith
(74) *Attorney, Agent, or Firm* — GrayRobinson P.A.; Michael J. Colitz, III

(57) ABSTRACT

The present disclosure relates to a transitional mode high speed rail system. The high speed rail infrastructure employed by the system is constructed adjacent a conventional host highway. The infrastructure can be provided adjacent to acceleration/deceleration lanes, or emergency parking/paved shoulder lanes. The vehicles used by the system are individual, self-powered, self-operating, individual mass passenger transport vehicles similar in size and appearance to municipal buses. These are transitional mode vehicles because they operate as railroad vehicles on the high speed rail infrastructure, but transition to automotive vehicle mode traveling on ordinary paved roads. They are mass passenger transport vehicles because many passengers can be accommodated.

33 Claims, 12 Drawing Sheets

(56) References Cited

U.S. PATENT DOCUMENTS

| | | |
|---|---|---|
| 6,934,603 B1 | 8/2005 | Kochanneck |
| 7,788,000 B1 | 8/2010 | Davis, Jr. |
| 7,975,618 B2 | 7/2011 | Bullis |
| 7,975,620 B2 * | 7/2011 | Pumpelly .................. 105/215.2 |
| 8,066,200 B2 * | 11/2011 | Hepner et al. ................... 238/2 |
| 8,342,101 B2 | 1/2013 | Kissel |
| 2002/0073876 A1 * | 6/2002 | Einar ............................ 104/125 |
| 2006/0196385 A1 * | 9/2006 | Stromberg .................... 104/124 |
| 2007/0256588 A1 * | 11/2007 | Costa ............................. 104/118 |
| 2007/0289477 A1 * | 12/2007 | Sobolewski ................ 105/215.2 |
| 2009/0050011 A1 * | 2/2009 | Li ............................. 104/130.01 |
| 2010/0043665 A1 * | 2/2010 | Brigham .................... 104/88.01 |
| 2011/0056405 A1 * | 3/2011 | Coester ........................ 104/124 |
| 2011/0196561 A1 * | 8/2011 | Jorgensen ....................... 701/23 |
| 2011/0226151 A1 * | 9/2011 | Pumpelly ...................... 104/118 |
| 2013/0055921 A1 * | 3/2013 | Kissel, Jr. .................... 104/124 |

* cited by examiner

TRANSITIONAL MODE HIGH SPEED RAIL SYSTEMS

CROSS-REFERENCE TO RELATED APPLICATIONS

This application claims priority to provisional patent application Ser. No. 61/524,822 filed on Aug. 18, 2011, and entitled "Transitional Mode High Speed Rail." The contents of this application are fully incorporated herein for all purposes.

TECHNICAL FIELD

This disclosure relates to a high speed rail system. More particularly, the present invention relates to a high speed rail system that employs individually powered passenger cars and that can travel between rail and road infrastructures.

BACKGROUND OF THE INVENTION

The present disclosure addresses three distinct transportation related problems. The three problems concern, high speed rail, the interstate highway system, and heavy freight hauling. Traditional high speed rail, also sometimes referred to as bullet trains, are well known in the art. Most high speed trains travel on standard gauge rail road beds and are limited to transporting passengers. Current high speed rail systems have serious limitations. Passengers can only get on and off at randomly located stations. The current high speed rail vehicle is a train composed of a heavy locomotive with some variable number of passenger cars. The train is inefficient because it requires the same personnel and same amount of energy to complete a scheduled trip whether it has one passenger or 500 passengers. High speed rail trains also suffer from limited flexibility, as the train can only travel where the rails go. Often the rail infrastructure is constructed through interstate highway medians, thereby making stations harder to access and requiring major highway and overpass construction. High speed locomotives may be powered by diesel fuel or by electricity. If powered by electricity, the electricity is provided by a continuous overhead power grid or a continuous electric feed in the rail bed structure. This is an expensive and inefficient way to deliver electric energy to the locomotives.

High speed rail trains also have little to differentiate between each other. They compete on speed. One manufacturer will claim 186 MPH, another will claim 250 MPH, and another may achieve 300 MPH for a few seconds under ideal conditions on a special straightaway. They can then claim that their train can travel 300 MPH. But such speeds are less relevant if the train has a station stop every few miles. Numerous stops may mean that a train rarely reaches 100 MPH and may average just 60 MPH. Yet, there are also drawbacks to having fewer stops between large cities. Fewer stops means that the trains can then reach higher speeds. However, with limited station stops, the trains will now receive revenue from fewer passengers.

Higher speed means increased aerodynamic resistance, less efficiency, more noise, more hazards, and ultimately higher costs. Furthermore, the cost of constructing these high speed rail systems (which may include track infrastructure, stations, locomotives and passenger cars) is very high. The primary purpose of any high speed rail system is to divert automotive traffic off of the overcrowded highways and to provide faster travel between major cities. High speed rail systems often fail because it is typically difficult for commuters to get to the stations, find a place to park, and travel on the trains' schedule. High speed rail systems also often leave commuters stranded at remote stations. As a result of the lack of popularity, high speed trains always require heavy government subsidies to make up for revenue shortfalls.

Current high speed rail is a successor to railroad passenger service that was provided from the earliest days of railroad and train services in the early 1800's up through the present AMTRAK passenger service. There is no technical difference between then and now other than alleged service improvement premised on projected speed. There is no direct correlation between present high speed rail and interstate highway travel. There is no physical interrelationship between present high speed rail and interstate highway traffic even when they share a common right-of-way. There is no interaction, impact, or involvement of heavy freight vehicles traveling on interstate highways with present high speed rail. Current high speed rail carries passengers exclusively. Hauling freight is left to the traditional freight rail carriers typically operating on separate road beds, so this means present High speed rail involves the construction of additional and dedicated infrastructure. High speed rail infrastructure does not add capacity to existing interstate highways. The infrastructure is dedicated to the exclusive use of high speed rail passenger trains and have no other usage or productive purpose.

A second problem addressed by the present disclosure concerns the interstate highway system. Interstate highways have become increasingly crowded and sometimes overcrowded. Often times traffic becomes so heavy it comes to a standstill. It is an irony that a multi-lane road with no stop signs and no traffic signals experience reduced capacity as its traffic load increases and eventually, as traffic reaches a maximum, the capacity of the roadway becomes zero, traffic simply stops moving. Interstate highways need more lanes, but more lanes means they must increase right-of-way, rebuild overpasses, move existing lanes, and reconstruct drainage structures. It is almost like building the entire interstate from scratch just to add one or two traffic lanes.

A third problem addressed by the present disclosure relates to heavy freight hauling that is now done by diesel tractor trailers. These tractor trailers pull most of their long haul loads on interstate highways. A concern is that some 20% of total automotive pollution comes from tractor trailers. Convert all cars, SUV's, vans, and pick-up trucks to electric and 20% of the pollution will remain. A disproportionate share of highway accidents involve tractor trailers. Yet another problem is that heavy loaded tractor trailers are estimated to cause 90% of the damage requiring road maintenance repairs.

Tractor trailer operators have many other problems to deal with. Long distance freight haulers are competing with rail freight, and regulations allow operators to drive only so many miles or hours a day before they must sleep, make fuel stops, or restroom stops. Operators must also schedule loads and deliveries. Speed limits and traffic congestion create further delays. The cost of diesel fuel is also increasing just as the costs of gasoline and other fuels.

The transitional mode high speed rail system of the present disclosure seeks to overcome aforementioned problems associated with traditional high speed rail, our current interstate highway system, and heavy freight hauling. The invention detailed in the present disclosure is aimed at overcoming these and other problems present in the background art.

SUMMARY OF THE INVENTION

It is an object of the present disclosure to provide a high Speed rail system that does not have the disadvantages associated with current high speed rail systems, such as bullet trains.

One of the advantages of the high speed rail system of the present disclosure is that it eliminates the need for on-line stations or on-line station stops.

Yet another advantage is realized by using a series of individually powered mass transit vehicles instead of passenger cars pulled by a locomotive.

A further advantage is that the system of the present disclosure allows individual mass transit passenger vehicles to get on and off of a rail system (or skyway) at any interchange associated with an existing interstate highway.

It is also an advantage to provide rail infrastructure on the outer sides of a paved roadway and infrastructure that passes over or under the existing overpasses.

Still yet another advantage is realized by using the on and off ramps of an existing interstate highway to get mass passenger transport vehicles on and off of the high speed rail infrastructures.

It is an advantage of the present disclosure to require all vehicles on the rail infrastructure (or skyway) to always travel at minimum velocity, with no stops, slowing down, or stopping anywhere or anytime.

The system of the present disclosure effectively increases the number of interstate highway lanes from the equivalent of six to eight travel lanes without having to reconstruct the existing highway and overpasses.

The disclosed system also allows non-passenger vehicles, such as hauling heavy freight vehicles, to share the use and benefit of the high speed rail system, with equal accessibility as the mass passenger transport vehicles.

The system provides so many advantages to freight operators that they would likely replace their diesel tractor trailers with suitable electric high speed rail freighters.

The system provides direct access ramps on and off the transitional mode high speed rail infrastructure without use of the interstate highway on and off interchanges or traffic lanes.

Another advantage by the present system is realized by using a pulse charging process to provide electric energy from the infrastructure to associated vehicles.

These and other advantages are realized via a transitional mode high speed rail, passenger carrying mass transit transportation system with a separate dedicated unique skyway infrastructure that uses rails for vehicles to travel over. This high speed rail is referenced as a "transitional mode" because the vehicles using it are traveling on rails, but when they leave the system they make a transition from a railroad mode to the automobile mode and travel on conventional paved road surfaces. It is high speed because vehicles travel at least a minimum of 120 MPH up to 125 MPH. However, it has many improvements over traditional high speed rail, prior art. The current invention does not have station stops along the skyway infrastructure, it uses individual vehicles approximately the size and capacity of municipal buses, and they can operate as buses when not on the high speed rail skyway, the skyway follows outside the paved lanes of the highway right-of-way it is using so the existing highway does not get disturbed, the infrastructure can share the right-of-way with interstate highways or any major thoroughfare even if it has no median or interchanges, vehicles travel at a minimum constant velocity on the skyway no matter how many vehicles are using the system. Individual mass transit passenger vehicles get on and off the skyway at any interstate highway interchange or any major crossroad if traveling along a thoroughfare. The self-powered vehicles are electric powered hybrids, use fuel cells or any acceptable clean energy supply or energy storage device for energy when traveling off of the skyway on conventional roads. In the preferred embodiment the mass passenger transports in this system may receive pulse charging when traveling on the system infrastructure. The bimodal wheels allow travel on conventional roads or on the steel rails of the skyway infrastructure.

The current invention increases the effective number of interstate highway lanes because any suitably equipped vehicle on the highway can access the skyway and travel with the flow of the high speed rail traffic. The high speed rails on both sides increases the interstate highway by the equivalent capacity of 6 to 8 lanes.

Freight vehicles, built to the standards of the skyway system, may also use the transitional mode high speed rail infrastructure. This would enable a freight operator to haul three times as much freight in the same amount of time while cutting delivery time to one third the time required for the traditional over the road diesel tractor trailer.

Various embodiments of the invention may have none, some, or all of these advantages. Other technical advantages of the present invention will be readily apparent to one skilled in the art.

BRIEF DESCRIPTION OF THE SEVERAL VIEWS OF THE DRAWING

For a more complete understanding of the present disclosure and its advantages, reference is now made to the following descriptions, taken in conjunction with the accompanying drawings, in which.

DETAILED DESCRIPTION OF THE INVENTION

The present disclosure relates to a transitional mode high speed rail system. The high speed rail infrastructure employed by the system is constructed adjacent a conventional host highway. The infrastructure can be provided adjacent to acceleration/deceleration lanes, or emergency parking/paved shoulder lanes. The various vehicles used by the system include individual, self-powered, self-operating, individual mass passenger transport vehicles similar in size and appearance to municipal buses. These are transitional mode vehicles because they operate as railroad vehicles on the high speed rail infrastructure, but transition to automotive vehicle mode traveling on ordinary paved roads. They are mass passenger transport vehicles because many passengers can be accommodated. Throughout this description these vehicles will be referred to simply as mass passenger transports (or "MPTs"). The various details of the present invention, and the manner in which they interrelate, will be described in greater detail hereinafter.

Figure 1A:
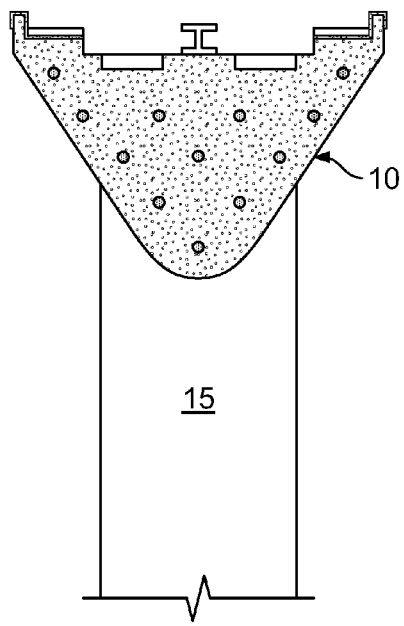
FIG. 1a is a cross-section of elevated transitional mode high speed rail infrastructure formed from concrete.
Figure 1B:
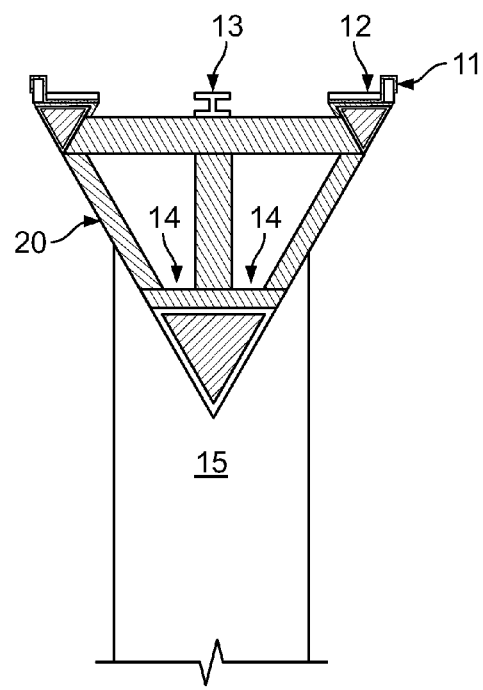
FIG. 1b is a cross-section of elevated transitional mode high speed rail infrastructure formed from steel.

FIG. 1 is a schematic diagram illustrating a cross section of two variations of the primary embodiment of the high speed rail Infrastructure. FIG. 1a illustrates a concrete infrastructure 10. FIG. 1b shows a steel infrastructure 20. Each variation has rails 11, a contact surface 12, a security rail 13, and plenums for electric power transmission 14. Each variation is also supported upon a hollow concrete columns 15. Infrastructure (10 or 20) may incorporate components from the Integrated Multimodal Transportation System and Associated Infrastructure described in commonly owned patent application Ser. No. 12/827,437 filed on Jun. 30, 2010 (now U.S. Pat. No. 8,342,101). The contents of U.S. Pat. No. 8,342, 101 are incorporated herein for all purposes.

Figure 2:
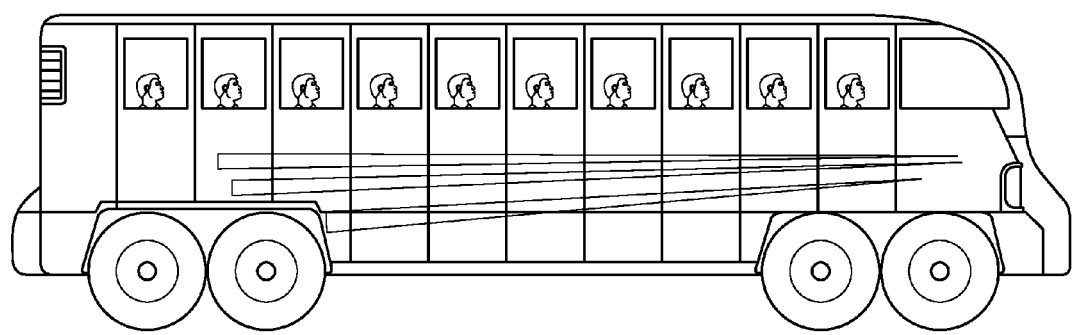
FIG. 2 is side elevational view of transitional mode mass passenger transport vehicle.
Figure 3:
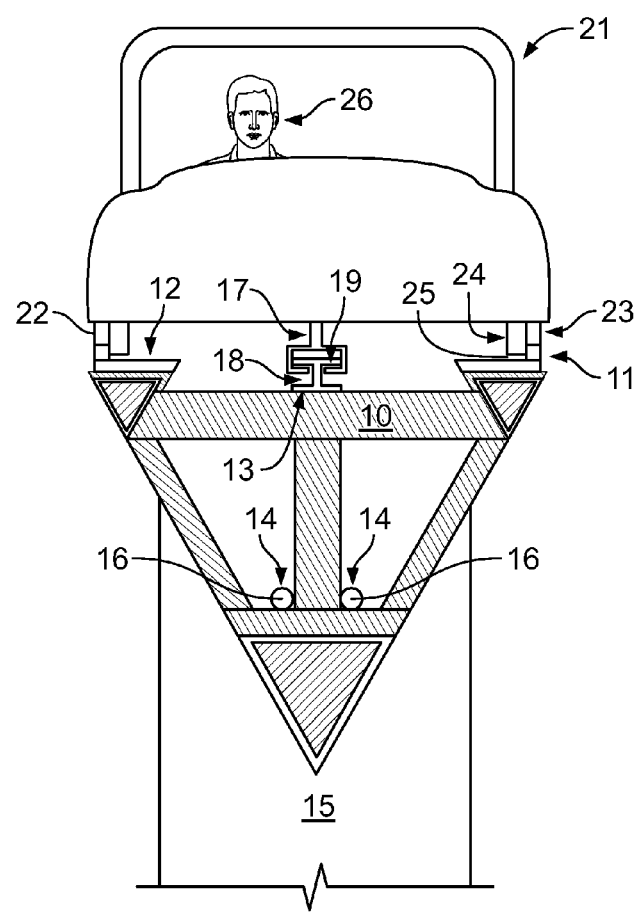
FIG. 3 is front elevational view of a transitional mode mass passenger transport locked onto a section of a high speed rail.

FIGS. 2 and 3 illustrates an MPT. FIG. 2 is a front view of the MPT 21 showing a driver 26, rails 11, contact surface pavement 12, security rail 13, plenum for electric power transmission 14, hollow concrete column 15 supporting the infrastructure, high voltage electric lines 16 for distributing electric power to the MPTs 21. Saddle 17 secures MPT 21 to the infrastructure 10. An electric charging contact surface 18 is included for passing electricity from the infrastructure 10 to the electric contact surface 19 attached to the saddle 17. Saddle 17, in turn, delivers electrical power into MPT 21. MPT 21 is equipped with bimodal wheels 22 which have a steel or metallic rim 23 for travel on rails and rubber or resilient wheels (or tires) 24 for flat surfaces. There is preferably a space 25 between the rubber wheels 24 and contact surface 12. Contact surface 12 is used to give MPT 21 extra traction for on ramps, or when MPT 21 is accelerating rapidly or going up steep uphill grades. In such situations, rails 11 are shortened to allow contact surface 12 to contact wheels 24 for additional traction. Contact surface 12 can also be employed whenever MPTs 21 change from one high speed rail structure to an adjacent high speed rail structure. Bimodal wheels 22 may incorporate components from the Integrated Multimodal Transportation System and Associated Infrastructure described in commonly owned patent application Ser. No. 12/827,437 filed on Jun. 30, 2010. The contents of this co-pending application are incorporated herein for all purposes.

Figure 4:
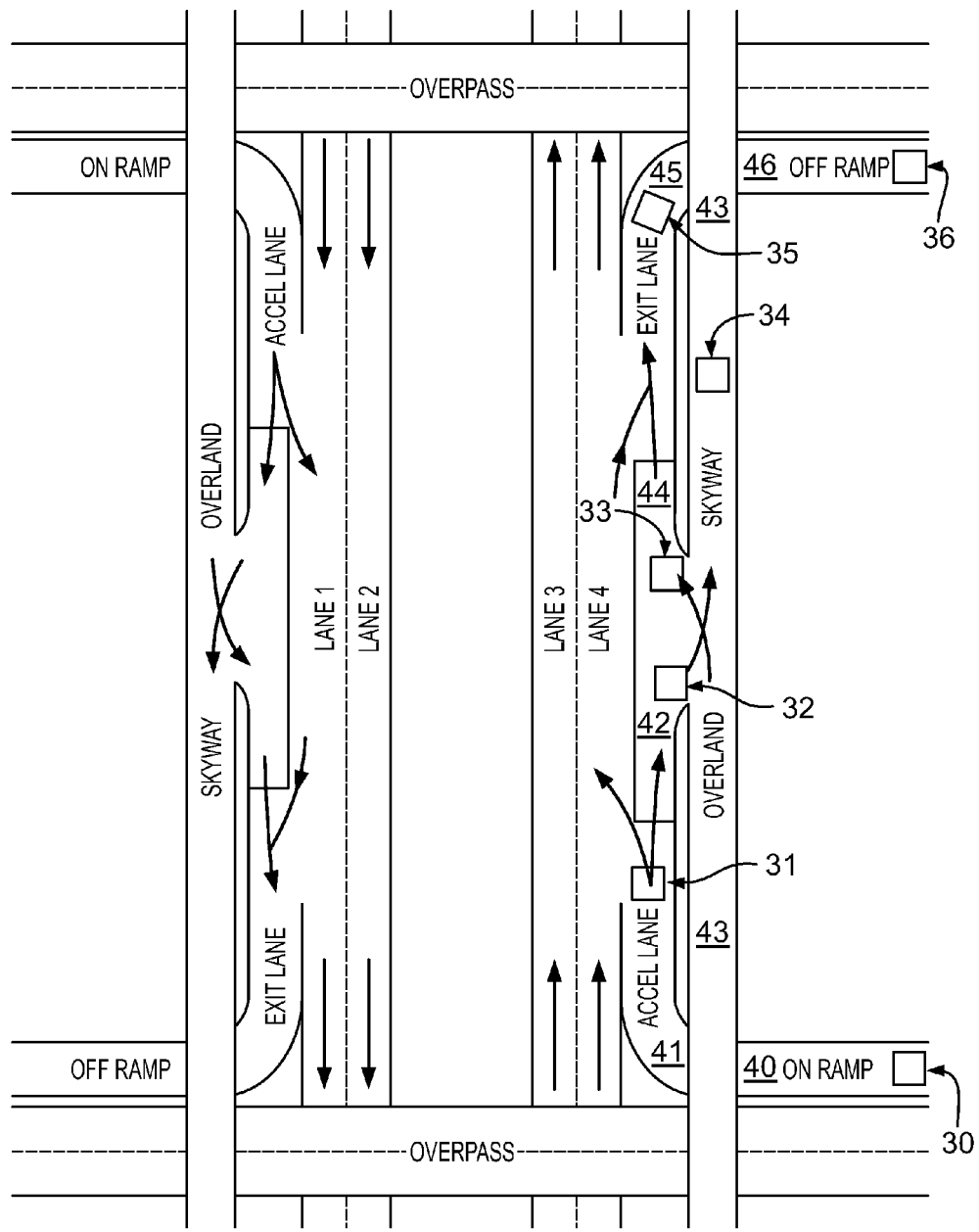
FIG. 4 is a top plan view of a transitional mode high speed rail system illustrating access ramps to and from an interstate highway.

FIG. 4 illustrates a series of vehicles, which may be MPTs, using the high speed infrastructure of the present disclosure. Vehicle 30 enters the interstate highway using the on ramp 40 in a conventional fashion. Vehicle 31 is on the acceleration lane 41 and can merge into Lane 4 if it wants to travel on the interstate, but since it is a MPT it continues straight ahead up the on ramp 42 to an elevated high speed rail infrastructure 43. Elevated high speed rail infrastructure 43 may employ either of the constructions described above in connection with FIGS. 1a and 1b. Vehicle 32 has reached the position where it is traveling the required velocity and can switch onto the high speed rail 43. If vehicle 32 did not achieve the required velocity, or if some other malfunction was detected during the on ramp, then vehicle 32 would not have been allowed to merge onto 43 and would have been sent down the off ramp 44 where vehicle 32 could merge into Lane 4 or exit the interstate. Vehicle 33 is shown exiting infrastructure 43 and onto the off ramp 44 where it decelerates to interstate speed. Vehicle 34 is shown traveling along on infrastructure 43 at the minimum controlled velocity. Vehicle 35 is getting ready to exit from exit lane 45.

Vehicle 36 is taking the off ramp 46 to exit the interstate highway like any other vehicle. The vehicle 36 was turned over to the manual control of the MPT vehicle operator as it came down the exit ramp. The vehicle operator had to indicate he was ready to take over control before the vehicle was allowed to exit the high speed rail 43. Vehicle 36 can be driven anywhere on the road just like any conventional automotive vehicle. This completes the basic description of how the preferred embodiment is used by a MPT except for the pulsed energy supply to the vehicle while it is on the skyway, which will be described hereinafter.

Figure 5:
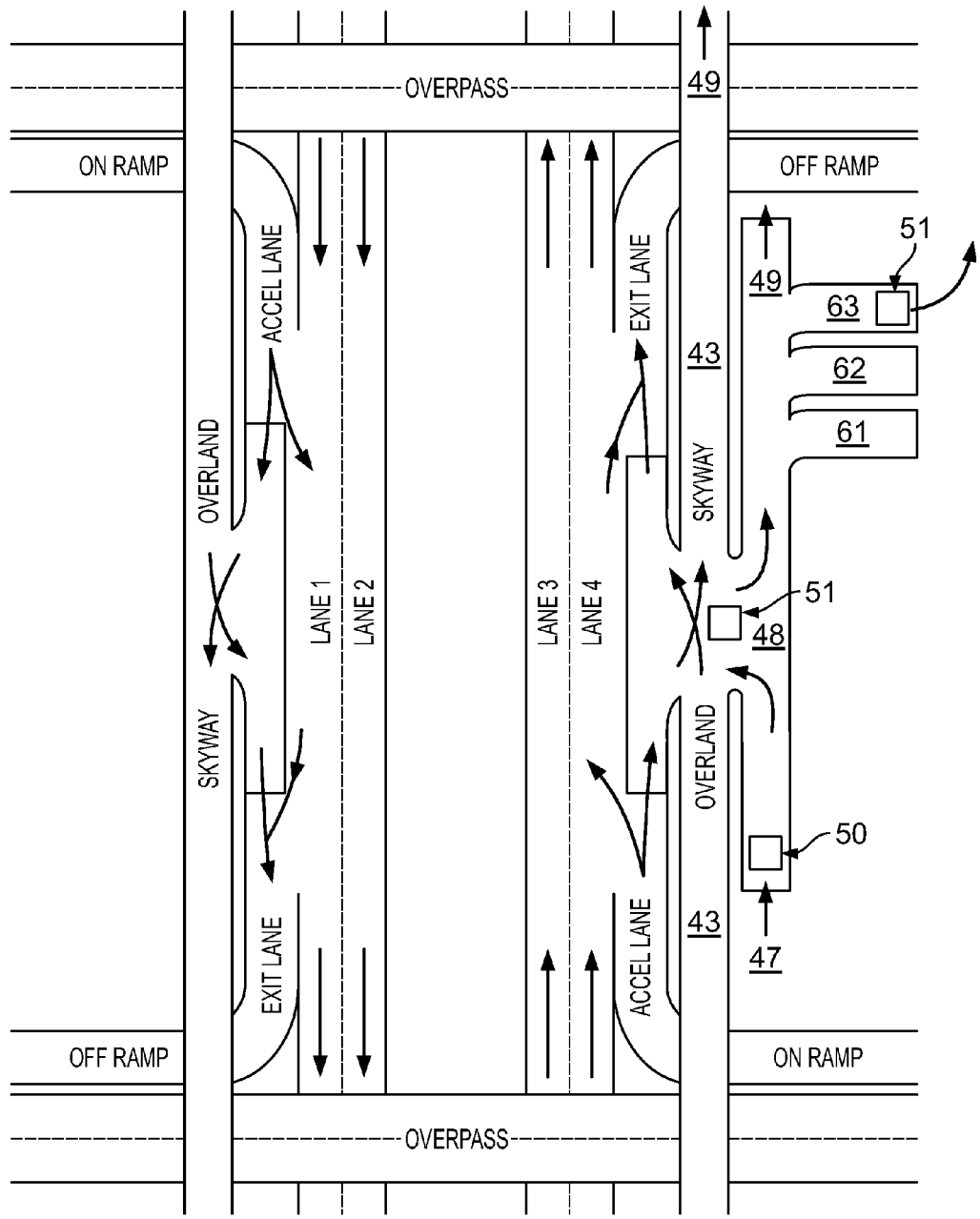
FIG. 5 is a top plan view of a transitional mode high speed rail system illustrating access ramps to and from an interstate highway also alternate external on and off direct access ramps with spurs that bypass the interstate highway access ramps and interchange.

A more advanced application of the preferred embodiment of the transitional mode high speed rail system is demonstrated in FIG. 5. FIG. 5 illustrates an external on and off ramp system (47, 48, 49, 61, 62 and 63) which allows vehicles to access the high speed rail infrastructure where there are no interstate highway on and off ramps. This allows another degree of flexibility. A driver of MPT 50 drives to the on ramp 47 and parks the vehicle. The vehicle operator gets out and the vehicle then proceeds onto the high speed rail infrastructure 43 without an operator. This is the same kind of MPT as described above. The MPT vehicle does not need an operator while on the system. When a vehicle 51 is ready to leave the high speed rail 43 it exits at 48, goes down the off ramp and turns into any designated spur 61, 62, or 63 and stops. When vehicle 51 stops an operator gets into the driver seat and drives the mass passenger transport away manually. This latter process avoids the cost of an operator while the vehicle is on the transitional mode high speed rail infrastructure.

Figure 6:
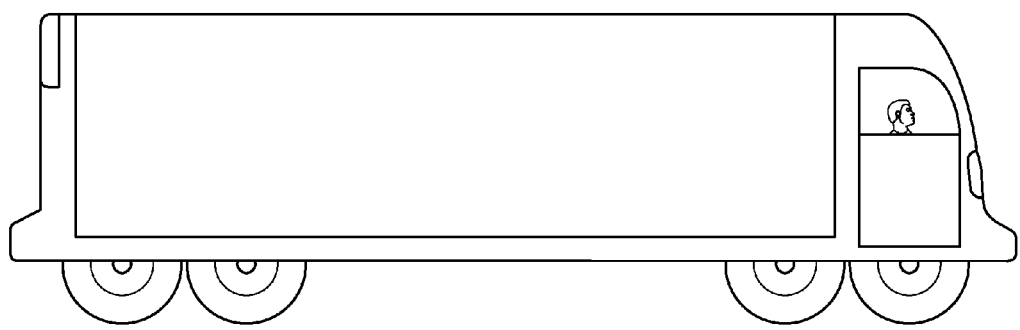
FIG. 6 is a side elevational view of a heavy freight transport vehicle with a compartment for a truck operator in the vehicle.

The disclosed transitional mode high speed rail handles heavy freight vehicles in addition to passengers. The heavy freight vehicle 70 shown in FIG. 6 is comparable in dimensions, weight and capacity to a conventional diesel powered tractor trailer that would ordinarily use the interstate highway except it has a unit body. This vehicle has a compartment for the truck driver; however, the vehicle is completely automated when on the high speed rail system.

Figure 7:
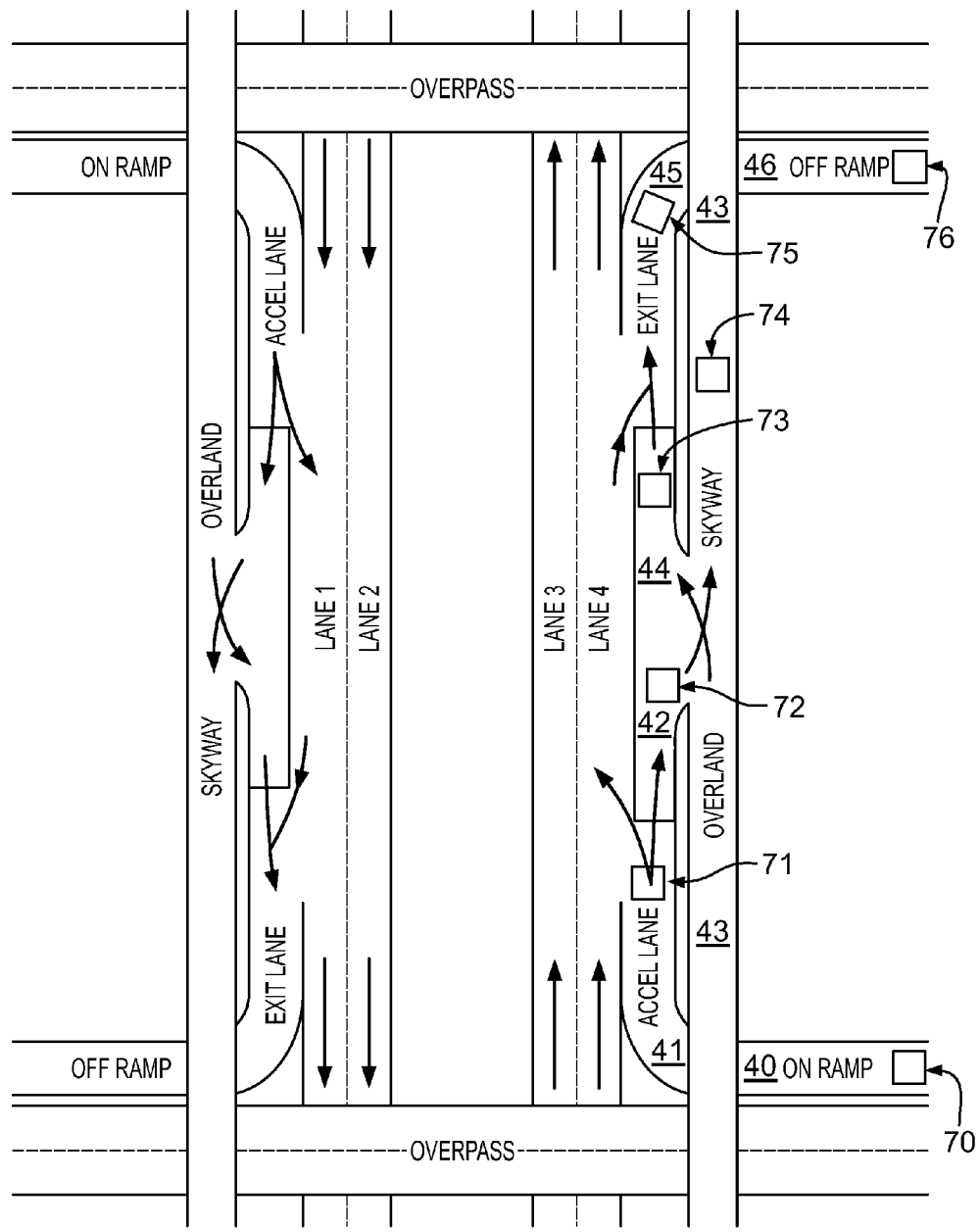
FIG. 7 is a top plan view a transitional mode high speed rail system illustrating how operators of heavy freight transports interact between the transitional mode high speed rail and use of the interstate highway.

FIG. 7 illustrates how the operator of a heavy freight transport 70 uses the transitional mode high speed rail infrastructure. A heavy freight transport 70 is driven onto the on ramp 40 of the interstate highway just the same as if it were a conventional diesel tractor trailer getting on the highway. The vehicle moves to the acceleration lane 41. At position 71 the conventional diesel tractor trailer would merge left into travel Lane 4 on the interstate highway, but the heavy freight transport 70 continues straight ahead onto the access ramp 41 and as vehicle 72 merges onto the High Speed Rail infrastructure. Other vehicles 73 are exiting the high speed rail using off ramp 44. Vehicle 75 is using the exit lane 45 and vehicle 76 is using the off ramp at 46. Vehicle 74 is continuing its journey on the high speed rail 43. The truck driver has nothing to do as far as operating the vehicle while on the high speed rail. When the heavy freight transport 70 reaches its scheduled exit location the automated system alerts the truck driver that he must be prepared to operate the vehicle before it is allowed to exit. The vehicle operator must perform some manual and communications protocol to demonstrate he is ready to control the vehicle when it is released onto the interstate highway.

The operator of a diesel tractor trailer has to stop for fuel, travel in traffic, follow speed limits and is allowed to travel a limited number of hours per day. The truck driver operating the heavy freight transport on the high speed rail is traveling 120 MPH, no traffic, no fuel stops, he can go to sleep, he can schedule his next load pick-ups, he can accurately schedule delivery. If his vehicle has the same capacity as the diesel tractor trailer he will be able to move three times as much freight in the same amount of time, and he will deliver the freight in one third the time. There are the additional advantages of lower energy costs, higher efficiency of steel wheels on steel rails, less stress and lower maintenance. The freight operator using the high speed rail would have a huge economic advantage over the diesel tractor trailer operator. The end result is that very quickly most diesel tractor trailers would be off the interstate.

Figure 8:
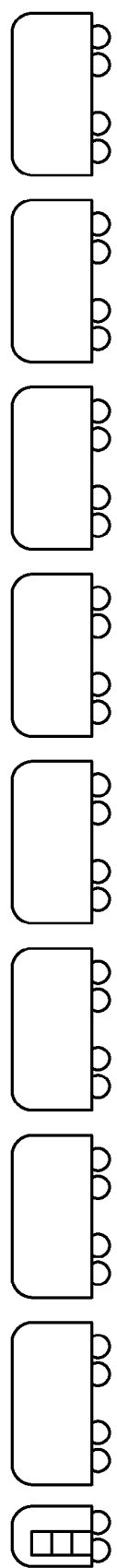
FIG. 8 is a side elevational view of a follow me wireless trailer hitch freight caravan of self-powered completely automated, driverless, heavy freight transports led by a single tractor vehicle with a single operator inside.
Figure 9:
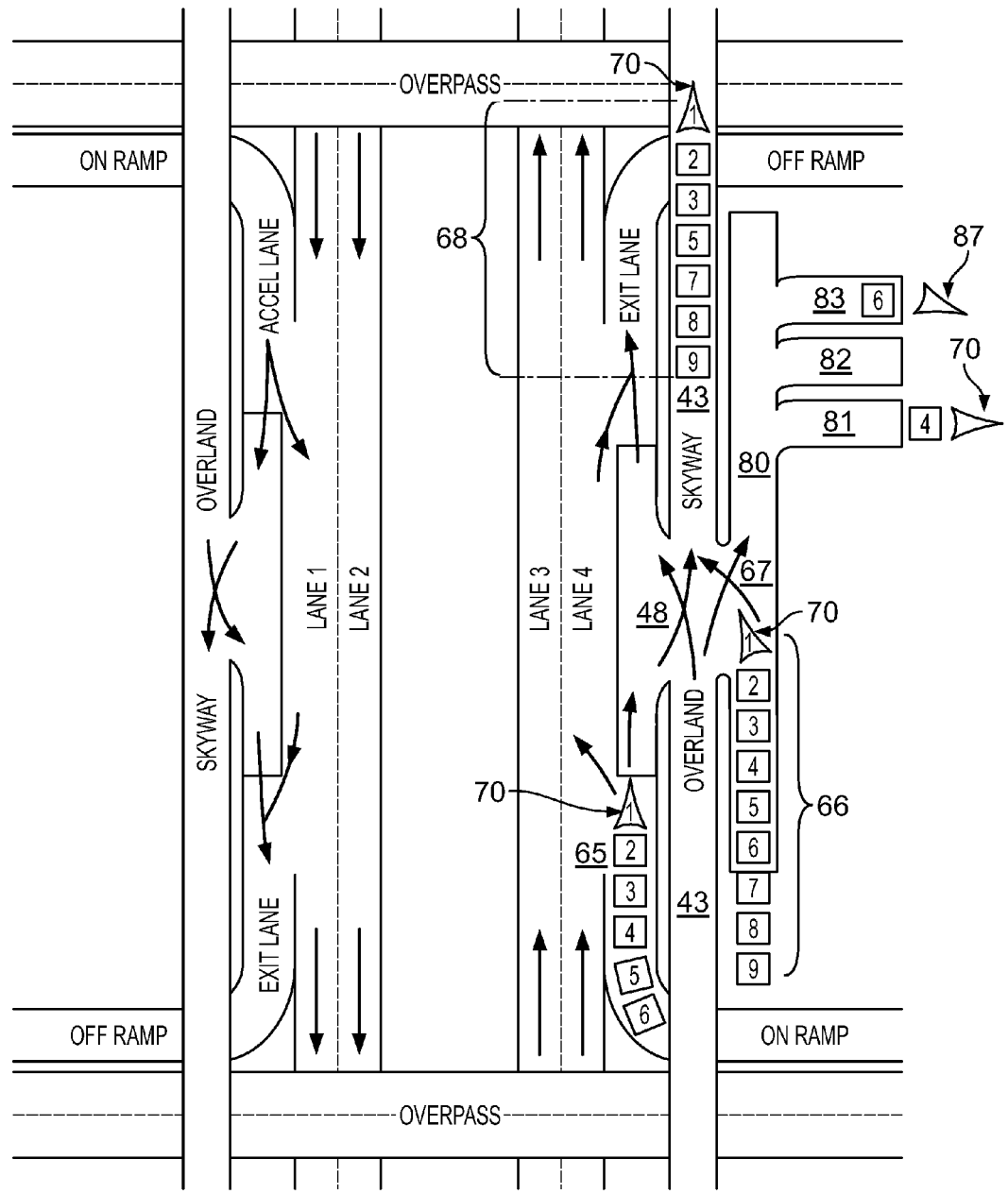
FIG. 9 is a top plan view of a transitional mode high speed rail system illustrating several follow me heavy freight transport caravans using the interstate highway for accessing the high speed rail; this view also shows the follow me heavy transport caravans using the direct access external ramps to get on and off the high speed rail.

FIG. 8 illustrates a more advanced "Follow Me Wireless Trailer Hitch Heavy Freight Caravan." This arrangement leverages the individual freight operator even more. FIG. 9 shows the freight caravan 65 on the interstate highway preparing to go up the ramp onto the high speed rail 43. FIG. 9 also shows a freight caravan 66 preparing to use the external access ramp 67 to get onto the high speed rail 43. The tractor at the head of each freight caravan has an operator. The vehicles in the caravan are connected to the tractor 70 with an invisible wireless cyber hitch (IWCH). Each vehicle in the caravan is aware of the lead vehicle 70 and of every other vehicle in the caravan. Using GPS and wireless communications the tractor 70 controls every movement of the trailing vehicles, their speed, spacing, and when they turn. This allows the tractor to lead the caravan onto the interstate highway with no operators in the vehicles and in addition, these caravan vehicles are unable to operate automatically on the interstate. Vehicles in the caravan do not need an operator on the high speed rail, but they need to follow the lead tractor on the interstate. Caravan vehicles do not need and do not have a compartment for a vehicle operator. As caravans travel along the skyway 43, one or more of the caravan vehicles may reach its delivery exit. For example, caravan 68 has had heavy freight transports 4 and 6 exit the caravan at 48, go down the ramp 80 and into spurs 81 and 83, and stop. Remaining vehicles 1, 2, 3, 5, 7, 8, and 9 continue on their way. Soon after, the vehicles 86 and 87 arrive and, like vehicles 70, these are caravan lead vehicles with Invisible Wireless Cyber Hitches. Their signals lock on and vehicles 4 and 6 follow 86 and 87 to their delivery destination.

The freight caravan operator is now moving 18 times as much freight in the same number of driving hours as a truck driver of a diesel tractor trailer, but the freight is delivered three times as fast. Example: It takes three days to drive a diesel tractor trailer to the west coast. The freight caravan 68 can drive it in one day and can deliver six times as many freight transports in that one day, as the tractor trailer can deliver in three days.

Figure 10:
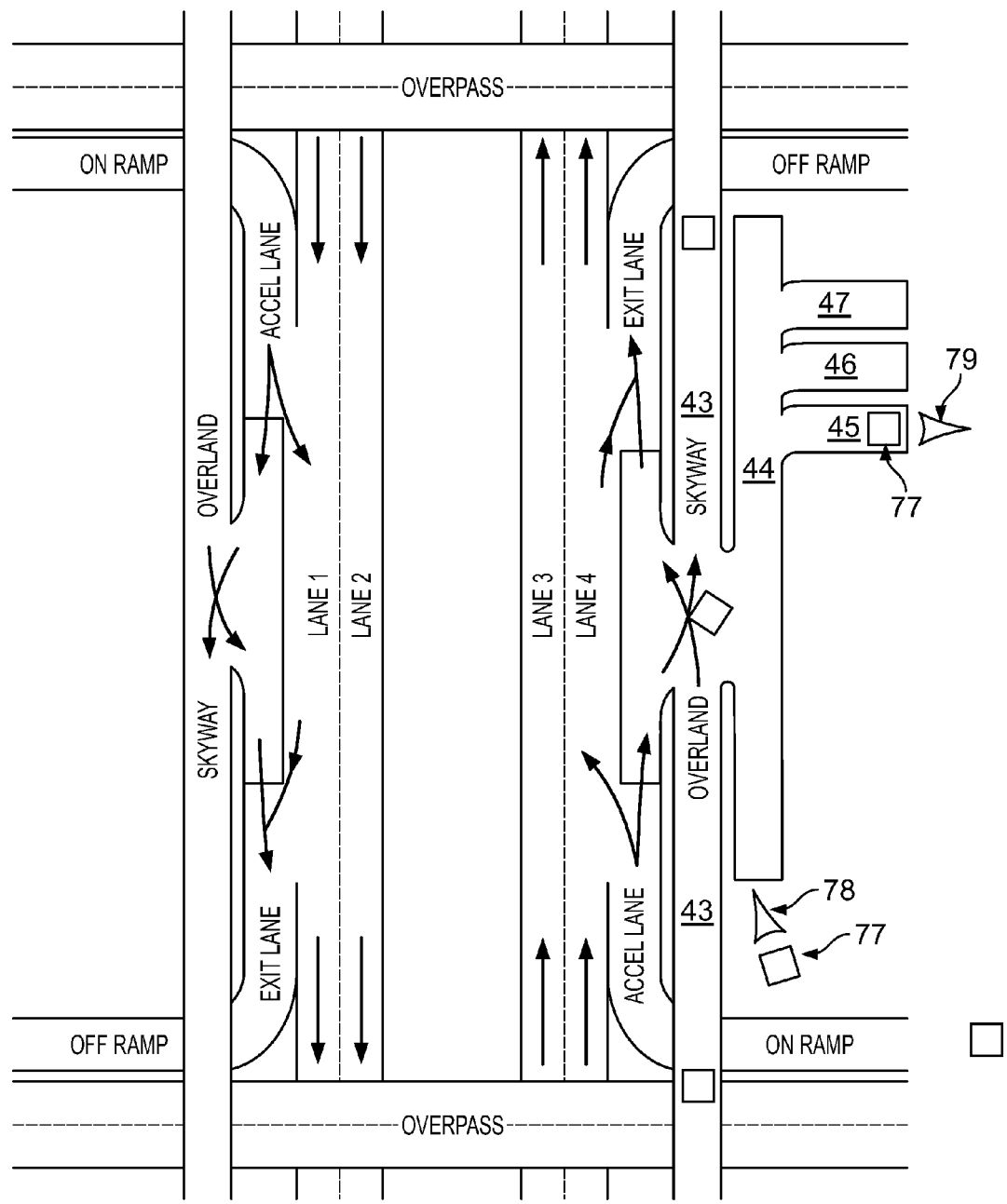
FIG. 10 is a top plan view of a transitional mode high speed rail system being used by fully automated heavy freight transports with follow me off system lead tractors.

FIG. 10 shows the top view of the transitional mode high speed rail system with the external access ramps. The same heavy freight vehicle as FIG. 8 that was used in the "Follow Me" freight caravan can be used. This vehicle does not have an operator, and it has no place for an operator to ride in the vehicle. Heavy freight vehicle 77 is being lead to the on ramp by a tractor using an "Invisible Wireless Cyber Hitch" 78. There is no physical connection, but they are wirelessly hitched. Vehicle 77 may have followed tractor 78 for several miles on conventional roads. When the "Invisible Wireless Cyber Hitch" is released vehicle 77 is ready to go onto the on ramp and onto the high speed rail by itself. The vehicle may travel several hundred miles. Referring again to FIG. 10, assume vehicle 77 has reached its destination, it exits the high speed rail 43, goes down the ramp 44, pulls into a parking spur 45 and stops. Eventually, a tractor 79 equipped with a "Invisible Wireless Cyber Hitch" 78 drives past within a given distance and vehicle 77 pulls up behind it and follows the tractor to wherever the delivery is to be made.

This changes the trucking industry. Truck drivers only lead heavy freight transports to and from the access ramps and parking spurs of the external access ramps of the transitional mode high speed rail. The freight vehicles travel automatically on the high speed rail without operators in the vehicles. The truck drivers do not have to go on the road away from home for several days on long trips.

Figure 11:
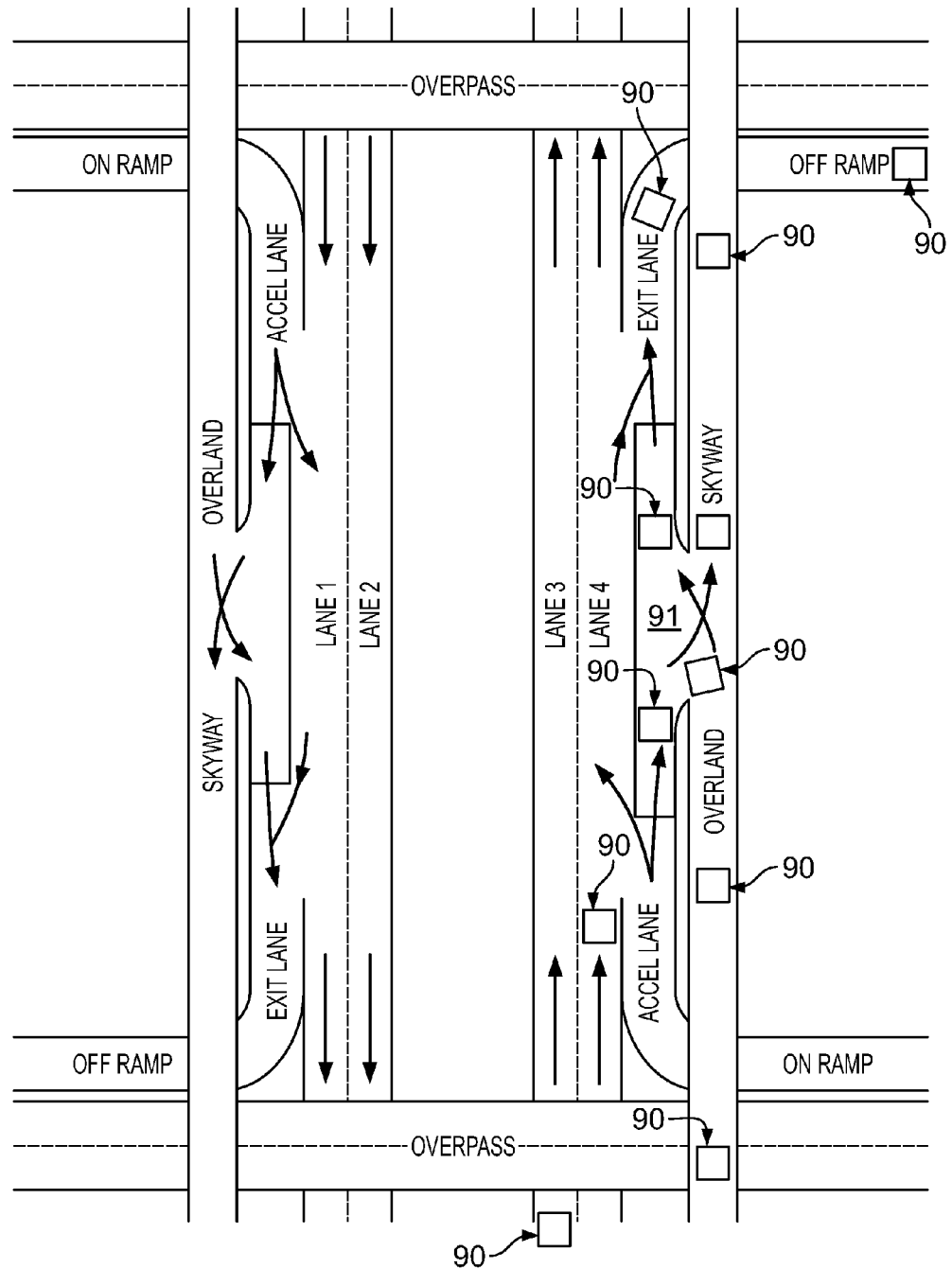
FIG. 11 is a top plan view of a transitional mode high speed rail system being used by a variety of small personal vehicles and delivery trucks.

FIG. 11 illustrates a top view of high speed rail with on and off ramps providing vehicle access to and from the interstate highway travel lanes and the transitional mode high speed rail infrastructure. Any private vehicle 90, whether it has only one passenger, or an SUV, or VAN, or BOX TRUCK used for deliveries to restaurants or convenience stores, traveling on the interstate highway can go to the access ramp 91 and if it is equipped to operate on the high speed rail infrastructure, get on and travel 120 MPH along with the mass passenger transports and heavy freight transports. This has the effect of increasing the number of travel lanes and capacity of the interstate highway.

As was indicated above, in the preferred embodiment the MPT, heavy freight transports and all vehicles operating on the transitional mode high speed rail, can be supplied with electric energy from high voltage pulses when they are operating on the transitional mode high speed rail Infrastructure. This electric energy drives the vehicle motors, air conditioning, all controls, all amenities for passengers and also charges any storage batteries or any other type of electric energy storage devices the vehicles may use when they have to operate on conventional roads or without the benefit of pulse charging.

Pulse charging is an energy efficient process for delivering electric energy to vehicles in a controlled environment on a transportation infrastructure. It is defined in commonly owned U.S. Pat. No. 8,179,091 and entitled Method and Apparatus for Protecting Charging Devices from Surges and Lightning Strikes and commonly owned U.S. Pat. No. 7,906,935 and entitled Method and Apparatus for Charging Electric Devices. The contents of both these patents are fully incorporated herein for all purposes. The process of pulse charging is nonetheless expanded hereinafter within the context of the present disclosure.

Figure 12:
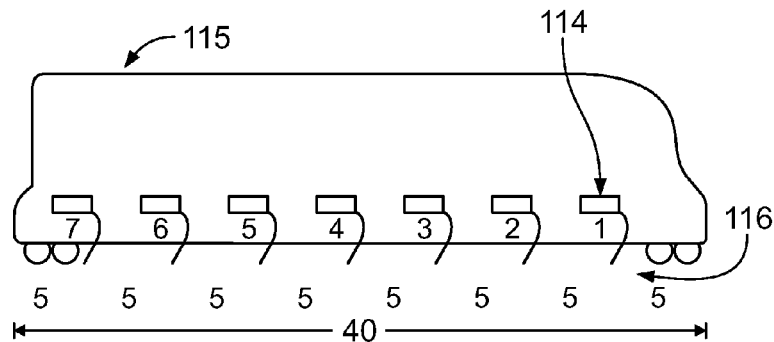
FIG. 12 is a side elevational view of a large vehicle such as a heavy freight transport illustrating various pulse charging components.
Figure 13:
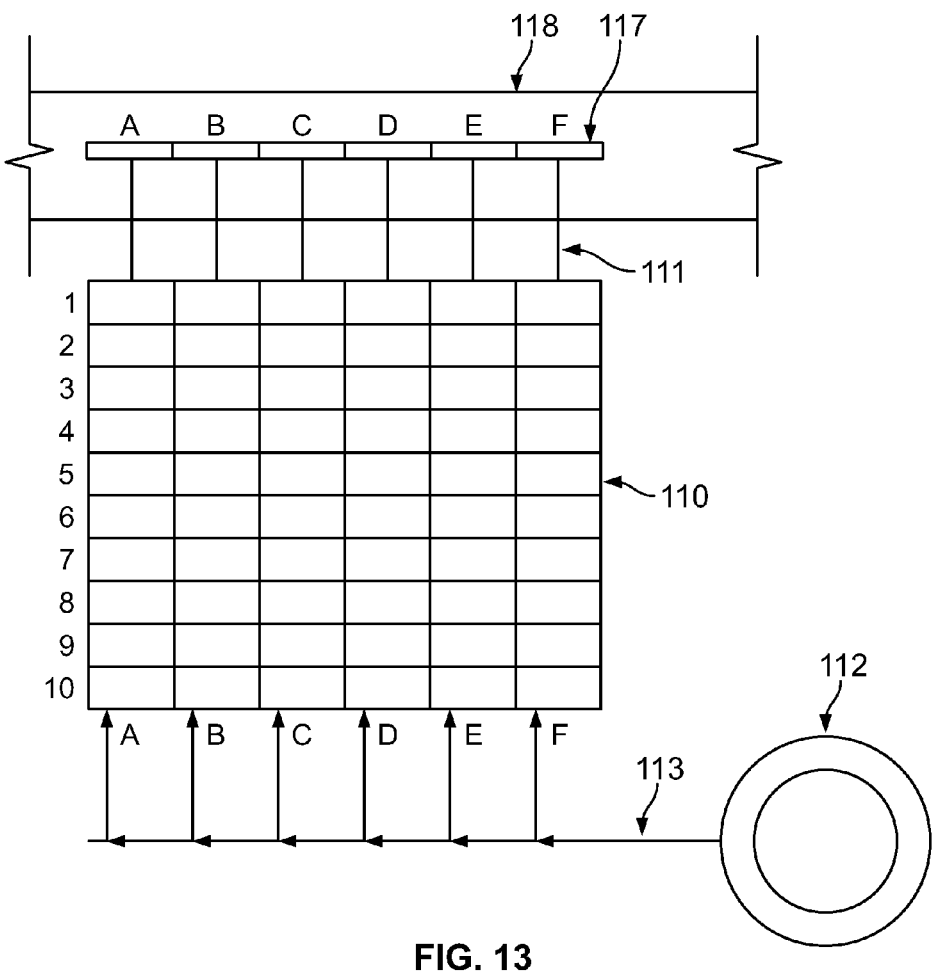
FIG. 13 is a schematic illustration of a pulse charging station with a series of contact power feed rails, a bank of energy storage devices for instantly recharging contact power feed rails, high voltage transmission lines, and a source generating electricity.

FIG. 12 shows a side view of an MPT. For illustration purposes assume the vehicle is 40 feet long. There are 7 electric contact receivers (1-7) (116) below the vehicle beginning five feet from the front, continuing at five foot intervals and the last is five foot from the back of the vehicle. These electric contact receivers (1-7) would normally be embedded in the saddles which would be under the bus, but for illustration they are not shown. In FIG. 1 there is a security rail 13 (or central control beam) that runs along the middle of the infrastructure. High voltage electric lines 113 (note FIG. 13) carry electric energy through the skyway infrastructures to a cascade of power storage stations 110. These stations create a series of storage buckets. A to F are end to end energy transfer surfaces. Then 1 to 10 are a cascade of stored energy buckets. As each vehicle power receiver passes over these, one stored energy bucket after the other is initiated. The power lines 113 refill them as fast as they are initiated. In FIG. 13 there are five central control beams 13 laying end to end. In FIG. 13 these segments 117 are labeled A through F. All we have done is cut the continuous central control beam 13 into six sections each five foot long. These are now contact power feed rails 117. When one of the electric contact receivers 116 comes in contact with a contact power feed rail 117, and if it is energized, then up to 0.5 KWH of electricity will flow from 117 through 116 and the 0.5 KWH of energy will be stored in ultracapacitors 114 (note FIG. 12) until the energy is needed for operating the vehicle. The 0.5 KWH is chosen because that is approximately the power required to operate a private automobile size vehicle for one mile. At 120 MPH the vehicle 115 is receiving recharging every 30 seconds. The electricity must be transferred in a few milliseconds, and each individual contact power feed rail 117 must be ready with a full 0.5 KWH charge an instant later as one electric contact receiver after another slides over it. In FIG. 13 there is a cascade of charged ultracapacitors 110, each containing 0.5 kwh of power. In column A there is a cascade of 10 ultracapacitors. Rows B, C, D, E, and F each of their own cascade or bank of 10 ultracapacitors. Column A is responsible for charging contact power feed rail A 117 from its cascade of 10 ultracapacitors. Every time an Electric Contact Receiver 116 (1 through 7) drags along the length of A 117 it will transfer 0.5 KWH of power to the vehicle ultracapacitors 114. Appropriate electronic circuits will cascade in sequence from 1-A to 2-A to 3-A and so on and then come back to 1-A. All the ultracapacitors in the storage cascade 110 are re-supplied with electricity from a power generating station 112 delivering the power through high voltage transmission lines 113.

Figure 14:
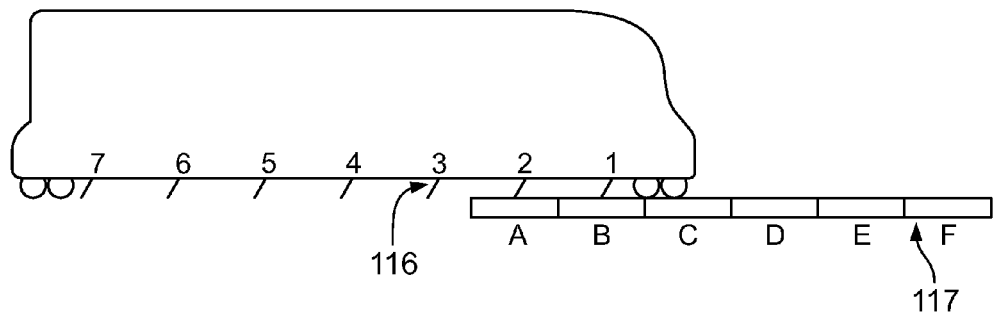
FIGS. 14-16 are side elevational views showing a heavy freight transport progressing through various stages of the pulse charging process.
Figure 15:
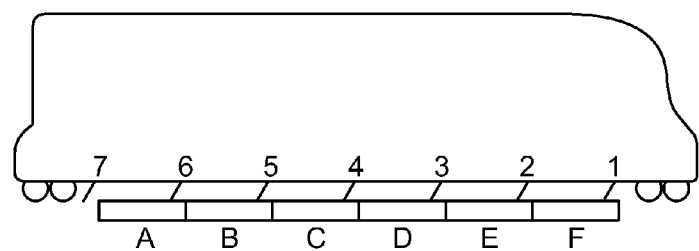
Figure 16:
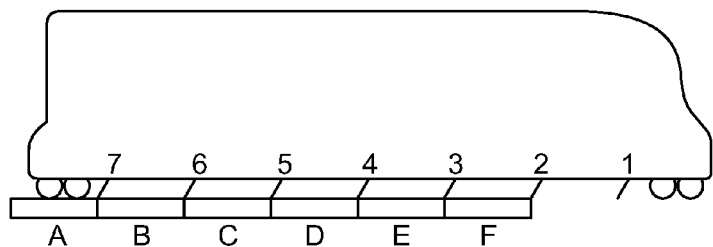

In FIG. 14 the vehicle is beginning to travel over the contact power feed rails in its path. Electric Contact Receiver 1 (116) has already received 0.5 KWH from A and B, while electric contact receiver 2 (116) has received 0.5 kwh from A. Contact power feed rail C (117) is about to be energized as soon as c is completely covered by the front of the vehicle. Contact power feed rail D, E, and F are not energized. In FIG. 15 all the electric contact receivers 116 are receiving electricity simultaneously except for 7. The Contact Power Feed Rails (117) A through F are transferring 0.5 KWH of electricity each and every 50 milliseconds or so. In FIG. 16 the electric contact receiver 1 and 2 (116) of the vehicle has just passed over the contact power feed rail F (117). Although F is still energized, contact power rail segment A is about to be de-energized, and B to F are still transferring energy through electric contact receivers (116) 3 to 7. This charging process is repeated at each charging station. Each Electric Contact Receiver (116) receives 0.5 KWH each time it travels along a contact power feed rail. So each of 7 electric contact receivers contacts 6 contact power feed rails. That means 7 times 6 times 0.5 KWH or 21 KWH of power has been transferred to the ultracapacitors in the vehicle. That is 42 times as much as a car weighing approximately 1500 to 2000 lbs. That is enough energy to operate either the MPTs or heavy freight transports.

If necessary, more electric energy could be transferred by making the vehicle longer, increasing the number of contact power feed rails or moving charging stations closer together. Another way is to make the contact power feed rails shorter, increase their quantity proportionately and move the electric contact receivers on the vehicle closer together to match the length of the shorter Contact power feed rails, increasing their numbers proportionately. All dimensions and quantities are for illustration and would vary depending on the situation.

The pulse charging process described above is able to provide pulse charging for vehicles of various sizes from a small private passenger, to intermediate size, to delivery trucks, box trucks, mass passenger transports to heavy freight transports. It is understood the process described above could be achieved in many ways with a variety of electronic solid state devices, electromagnetic devices, and any number of configurations. The essential problem with pulse charging a large vehicle is that the vehicle requires more power than what is stored on the individual contact power feed rails 117 for charging standard private vehicles. And in addition, the flow of electric power through the high voltage transmission lines 113 cannot carry sufficient current to recharge the contact power feed rails fast enough to charge the vehicle in the short time it has to pass over. Therefore, the power is accumulated. It is understood there are many parameters and choices of equipment an electronic or electrical engineer with ordinary technology skills can use for addressing this problem.

A private vehicle with one passenger may have just one Electric Contact Receiver System (116) installed in the saddle. The vehicle can receive all the power it needs (typically 0.5 KWH) from a single contact power feed rail 117. The contact power feed rail can be supplied from a single storage block, such as (1-A) in the electric energy storage bank 110. On the other hand, a heavy freight transport may need 20 or more KWH of power in just a few milliseconds. In the simplest most basic terms, the vehicle needs at least one or more Electric Contact Receivers (116) that will provide transfer by either direct contact, induction transfer, electromagnetic transfer, or a wireless transfer of electricity from one or more Contact Power Feed Rails (117), which could be deployed in a variety of configurations. There will need to be an electric energy storage bank (110) with enough stored energy to continue to charge the contact power feed rails (117) to supply a full charge to the vehicle, and to additional vehicles that may be directly behind. Keep in mind there could be a lead tractor with several Heavy freight transports following bumper to bumper. This could require delivery of as much as 140 KWH in perhaps less than 3 seconds. The equipment chosen and energy storage capacity shown in FIG. 13 must be sized accordingly. Supplying pulse charging to a string of single passenger vehicles is much different than providing pulse charging to a caravan of heavy freight transports. The electric energy storage bank cascade could use Ultracapacitor Technology, Solid State Devices, Fly Wheel Technology, SMES (Superconducting Electromagnetic Energy Storage Devices) or any other technology that is economical and is able to accomplish the objective. It is understood that, as traffic increases then the KWH of power flowing through the high voltage transmission lines (113) will increase and that will also affect the choice of equipment for the pulse charging process.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A multimodal high speed transportation system comprising:
   a guideway infrastructure supported by a series of support columns, the guideway infrastructure comprising a triangular frame that includes two opposing edges, empty space containing electronics, sensors, support beams, and support features, and a central extent, each opposing edge including a planar contact surface of fixed width and a rail positioned above the planar contact surface, a central control beam and a charging surface extending along the central extent, electric lines positioned within the guideway infrastructure and delivering electric power to the charging surface;
   a highway extending alongside the guideway infrastructure, the highway including a conventional road surface, the highway and the guideway infrastructure being interconnected at designated locations by way of on-ramps and off-ramps;
   a series of interconnected mass passenger transport (MPT), each MPT including a central saddle and a set of bimodal wheels, with each bimodal wheel including a metallic flange and a resilient tire, the rim and tire each having an axis of rotation that is substantially horizontal, each MPT adapted to travel between the skyway guideway infrastructure or the highway by way of the on-ramps and off-ramps, wherein when an MPT travels along the highway, the resilient tires contact the conventional road surface, and when an MPT travels along the guideway infrastructure, the metallic rims contact the rails and the saddle engages the central control beam and the MPT receives power from the charging surface.

2. The multimodal high speed transportation system as defined in claim 1 wherein the guideway infrastructure includes no passenger or freight stations and no passenger or freight station stops.

3. The multimodal high speed transportation system as defined in claim 1 wherein each of the MPTs is self-powered.

4. The multimodal high speed transportation system as described in claim 3 wherein the MPT is self-operating.

5. The multimodal high speed transportation system as described in claim 3 wherein the MPT is capable of operation either on the highway or guideway infrastructure.

6. The multimodal high speed transportation system as defined in claim 1 wherein MPT departure times are determined by an MPT operator.

7. The multimodal high speed transportation system as defined in claim 1 wherein the MPTs employ a hybrid, fuel cell, propane, hydrogen, battery, ultra capacitor, or similar fuel source on conventional roads.

8. The multimodal high speed transportation system as defined in claim 1 wherein the MPTs are permitted to access and exit the guideway infrastructure from and to paved roadway surfaces using the bimodal wheels that enable MPTs to travel on both surface modes without damage to either the infrastructure or MPTs.

9. The multimodal high speed transportation system as defined in claim 1 wherein each MPT saddle is engaged with the central control beam to secure or lock each individual MPT to the surface of the guideway infrastructure so there is no possibility of any MPT falling off of the system while traveling at high speeds.

10. The multimodal high speed transportation system as defined in claim 1 wherein the highway is a multi-lane limited access highway.

11. The multimodal high speed transportation system as defined in claim 1 wherein each MPT takes the form of a mass transit, heavy freight transport, single passenger, two passenger, SUV, family vehicle, pick-up type vehicle, van, delivery vehicle, or box truck.

12. The multimodal high speed transportation system as defined in claim 1 wherein all MPTs are completely automated while operating on the guideway infrastructure, and wherein all MPTs revert to manual control when they exit the guideway infrastructure to travel on conventional road surfaces.

13. The multimodal high speed transportation system as defined in claim 1 wherein the MPTs can travel between 120 to 175 miles per hour while on the guideway infrastructure.

14. The multimodal high speed transportation system as described in claim 1 wherein the MPTs use bimodal wheels, with each bimodal wheel including a metallic flange and a resilient tire, the flange and tire each having an axis of rotation that is substantially horizontal, each MPT adapted to travel between the skyway guideway infrastructure or the highway by way of the on-ramps and off-ramps, wherein when an MPT travels along the highway, the resilient tires contact the conventional road surface, and when an MPT travels along the skyway guideway infrastructure, the metallic rims contact the rails and the saddle engages the central control beam and the MPT receives power from the charging surface.

15. The multimodal high speed transportation system as described in claim 14 wherein the bimodal wheels comprise conventional air filled pneumatic wheels located interiorly and flanged rail wheels located exteriorly.

16. The multimodal high speed transportation system as described in claim 15 wherein the bimodal wheels have both the conventional air filled pneumatic wheels and flanged rail wheels in contact with the contact surface at the same time to provide further steering support and traction.

17. The multimodal high speed transportation system as described in claim 15 wherein only the flanged rail wheels are used for steering the MPT.

18. The multimodal high speed transportation system as described in claim 1 wherein the guideway infrastructure comprises a triangular, semicircular, or crescent-shaped configuration such that the multimodal high speed transportation system is elevated and supported for multiple MPTs at a given time.

19. The multimodal high speed transportation system as described in claim 18 wherein the guideway infrastructure configuration comprises hollow concrete or steel beams.

20. The multimodal high speed transportation system as described in claim 1 wherein the on-ramps and off-ramps have a fail-safe such that they are contiguous or parallel to the guideway infrastructure and such that they are conjunctively interconnected with the guideway infrastructure by a passive two way switch between the on-ramp or off-ramp and the guideway infrastructure.

21. The multimodal high speed transportation system as described in claim 1 where any contact between the central saddle and the central control beam results in transfer of electrical energy to the MPT.

22. The multimodal high speed transportation system as described in claim 21 wherein the transfer of electric energy is increased as needed to the size of the MPT travelling on the guideway infrastructure.

23. The multimodal high speed transportation system as described in claim 21 wherein the transfer of electric energy is increased proportionally to the number of electric contact power receivers attached to the MPT.

24. The multimodal high speed transportation system as described in claim 21 wherein the transfer of electrical energy from the guideway infrastructure to the MPT occurs in short, controlled high voltage bursts.

25. The multimodal high speed transportation system as described in claim 1 wherein the central saddle secures the MPT to the guideway infrastructure such that it initiates the transfer from the guideway infrastructure to the off-ramp and transfer from the on-ramp to the guideway infrastructure.

26. The multimodal high speed transportation system as described in claim 1 wherein the central saddle steers the MPT while in contact with the central control beam.

27. The multimodal high speed transportation system as described in claim 1 wherein the central saddle provides a communication pathway between the central control beam and the MPT for any electrical signals that are passed to or from the MPT.

28. The multimodal high speed transportation system as described in claim 1 wherein access to the guideway infrastructure is granted by the dedicated on-ramp or an interchange integrated into the existing highway.

29. The multimodal high speed transportation system as described in claim 1 wherein the off-ramp comprises several branch ramps for multiple vehicles.

30. The multimodal high speed transportation system as described in claim 1 wherein the central control beam containing the charging surface comprises a plurality of beams for supplying additional electric energy.

31. The multimodal high speed transportation system as described in claim 1 wherein the guideway infrastructure further comprises a plurality of electrical power storage stations arranged as a cascade of energy storage station where each cascade may feed one or more of the beams supplying electric energy.

32. The multimodal high speed transportation system as described in claim 1 wherein the guideway infrastructure comprises no stops, no intersections, no other convergent guideways, no dead ends, and no two way travel.

33. The multimodal high speed transportation system as described in claim 1 wherein the weight of the vehicle is supported by a pneumatic or resilient tire and steering is accomplished by the flange or the central control beam.

* * * * *